Nov. 24, 1964     G. E. NOAKES     3,158,404

MOLDED PLASTIC WHEEL

Filed March 26, 1963

INVENTOR.
GORDON E. NOAKES
BY
WILSON, SETTLE & CRAIG
ATTORNEYS

United States Patent Office 3,158,404
Patented Nov. 24, 1964

3,158,404
MOLDED PLASTIC WHEEL
Gordon E. Noakes, 3950 Napier, Plymouth, Mich.
Filed Mar. 26, 1963, Ser. No. 267,739
3 Claims. (Cl. 301—63)

This invention relates to improvements in wheel assemblies and more particularly to wheel assemblies such as tricycle wheels or the like which utilize injection molded plastic materials of relatively low tensile but substantial compression and impact strengths.

Essence of the Prior Art

In the past, wheel-hub structures such as front pedal crank wheels of children's tricycles and velocipedes, wheels for barrows, golf carts and analogous equipment have been produced in a wide variety of forms. These include wire spoke wheels with an annular pressed steel rim and a rubber tire snapped over and onto the rim. Also, such structures have been made in the form of stamped steel discs, two of which are welded together. These discs have been flanged at their outer perimeters so that when two discs are joined, a tire-holding rim is formed.

Relative to the above structures, the following characteristics are noted:

(1) Spoke wheels are expensive to manufacture. They are made up of many parts, including 20 or more spokes. These are costly to make and handle because of number, if nothing more. Further, welding and forming techniques are required along with substantial assembly labor to produce finished structures. Still further, a hub must be fabricated and assembled into the unit.

Also, spoke wheels are heavy, being made of steel. Shipping costs between manufacturer and wheel goods producer are high.

(2) Disc wheels are also expensive, requiring high cost stamping dies and presses and labor. Welding is also required to provide finished assemblies.

Also, these are heavy for shipment.

Because of the foregoing expenses of manufacturing and assembling the multi-unit pieces of the prior art, and the weight resulting in shipping costs, the products using these prior art components have necessarily been expensive, even though produced in mass quantities.

It is one object of the present invention to provide a wheel assembly which utilizes low cost, light weight, relatively low strength materials in a unique manner taking advantage of the compression and impact resistant characteristics of such materials. It is another object of the invention to provide a wheel assembly of improved economy of production by the use of a minimum number of parts capable of being assembled with an absolute minimum of labor and time.

Other objects of this invention will appear in the following description and appended claims, reference being had to the accompanying drawings forming a part of this specification wherein like reference characters designate corresponding parts in the several views.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
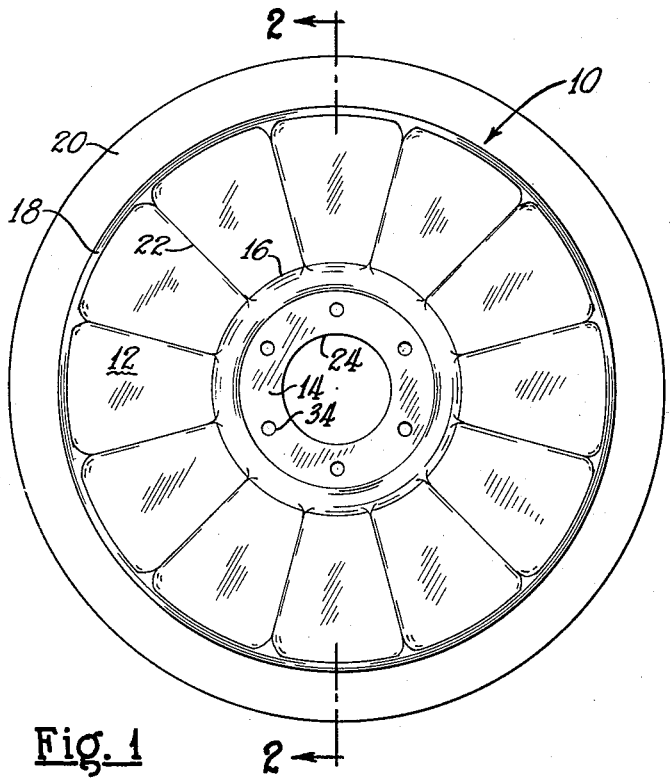
FIGURE 1 is an elevation of a molded wheel used in the invention.

Referring to FIGURE 1, a wheel element designed generally 10 includes a radially extending web 12 whose inner periphery is defined by a thickened annular wall 14. Between the wall 14 and the web 12 is an annular rib enlargement 16 of generally circular section.

Figure 2:
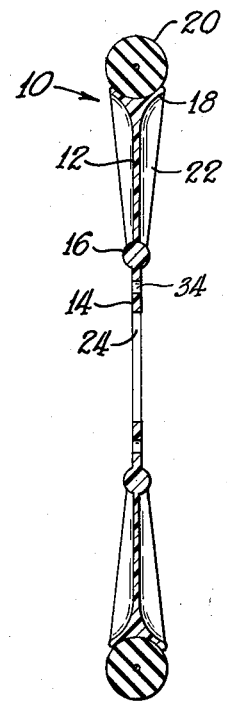
FIGURE 2 is a section view taken along the line 2—2 of FIGURE 1.

At the outer periphery, as best shown in FIGURE 2, the web 12 flares axially outwardly in both directions to form a rim designated 18. A tire 20 is snapped over this rim and retained in position by its own tension.

Extending between annular rib enlargement 16 and the rim 18 are a plurality of circumferentially spaced and radially extending reinforcement ribs 22 which project from both sides of the web wall 12. A center hole 24 is provided to receive a crank assembly described below.

The wheel 10 described above is integrally formed from a plastic material, such as polystyrene, by an injection molding process.

Figure 3:
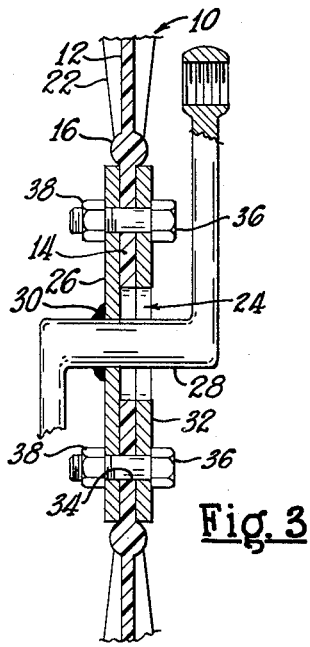
FIGURE 3 is a section view of an assembled hub of invention.

Referring to FIGURE 3, there is a sectional showing of one embodiment of a completed hub made in accordance with the invention. Although this hub is shown as adapted to use as the front wheel of a child's tricycle, it is to be understood that other ramifications within the scope of invention are evident. These will be set forth later.

Still referring to FIGURE 3, a crank-carrying washer 26 is fabricated of relatively high tensile strength material such as sheet steel or the like. A crank axle 28 is secured in a centrally located hole in washer 26 as by welding at 30. To the other side of the annular wall 14 of web 12 there is attached a plain annular washer element or disc 32. The discs 32 and 26 are apertured to mate with apertures 34 of annular wall 14 of wheel 10, see FIGURE 1, and bolts 36 are passed through all three elements and secured by nuts 38.

From the foregoing, it will be observed that the wheel assembly of the present invention comprises but three component parts in addition to the tire. These include the crank-carrying disc 26, the opposite reinforcement disc 32 and the unitary wheel piece 10.

It will be evident that the steel discs 26 and 32 reinforce the annular wall 14 of the injection molded plastic wheel 10 and provide sufficient strength for the usage to which the assembly will be subjected.

Although the injection molded polystyrene wheel 10 is of an inherently weak tensile material wheel 10 is strengthened in the manner described above to provide a rugged assembly of essentially three parts. The economics of manufacture of this structure will be readily evident to those skilled in the art.

Within the extended scope of invention, there are other ways of securing the strengthening discs 26 and 32 to either side of the thickened annular wall 14 to provide a completed assembly.

Figure 4:
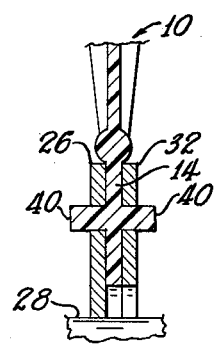
FIGURE 4 is a section of a second embodiment of the hub of invention.

Thus, in FIGURE 4, cylindrical projections 40 are molded to the annular wall portion 14. These project perpendicularly outwardly from such wall. In effect, these form a built-in rivet type fastening unit as a replacement for the bolt 36, FIGURE 3.

Figure 5:
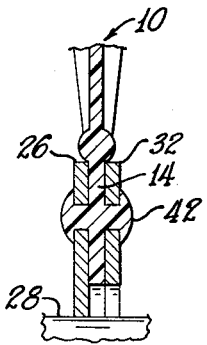
FIGURE 5 is a section similar to FIGURE 4 after a fastening operation.

The FIG. 4 embodiment is assembled by slipipng the discs 26 and 32 over the projections 40. Then, as shown in FIGURE 5, these are headed out as at 42, by application of an appropriate heating iron to flow the thermoplastic resin of the projections 40.

The foregoing description has related to the use of injection molded polystyrene to form the wheel element 10 in a single shot. Other materials which may be used to fabricate this element by injection molding would include nylon, polycarbonate resins, acrylics, acrylonitrile, butadiene-styrene copolymer and the like.

Additionally, die cast metals could be used in fabricating this structure.

As shown in FIGURE 3, a crank axle has been shown as passing through the center hole 24 of the assembled unit. The extended scope of invention would include a bearing at this point; the bearing suitably attached to discs 26 and 32. This type of hub would be used for a free-running wheel as on a golf cart, wheelbarrow, utility cart or other.

Advantages

Advantages inherent in the foregoing structure include the provision of a low cost lightweight injection molded wheel element of relatively low tensile but appreciable compression strength to provide extremely economical production and reinforced in such manner to take advantage of the compression strength of the material. The wheel assembly is of three basic parts as compared to multi-piece spoke units and the like of the prior art and achieves extreme ease of assembly, as by the ultimate consumer with concomitant cost reduction.

While I have described various embodiments of my invent, it will be apparent to those skilled in the art that the disclosed embodiments may be modified. Therefore, the foregoing description is to be considered exemplary rather than limiting and the true scope of the invention is that defined in the following claims.

I claim:

1. A wheel assembly comprising an annular web of molded plastic material such as polystyrene or the like having a central opening therethrough, a thickened annular rib integral with said web and coaxial with said opening located in adjacent spaced relationship to said opening, a thickened tire receiving rim integral with said web defining the outer periphery of said web, a plurality of thickened radially extending ribs integral with said web and extending from said annular rib to said rim, a pair of annular metallic washer elements disposed on opposite sides of said web radially inwardly of said annular rib, and means fixedly securing said washer elements to said web.

2. A wheel assembly as defined in claim 1 wherein that portion of said web inwardly of said annular rib is thicker than the portion of said web between said annular rib and said rim, and said securing means comprises a plurality of bolts projecting through aligned apertures in said washer elements and the portion of said web inwardly of said annular rib.

3. A wheel asssembly as defined in claim 1 wherein that portion of said web inwardly of said annular rib is thicker than the portion of the web between said annular rib and said rim, and said securing means comprises a plurality of integral axially extending projections on opposite sides of said web inwardly of said annular rim received in aligned apertures in said washer elements.

References Cited by the Examiner

UNITED STATES PATENTS

| 1,297,658 | 3/19 | Cantrell et al. | 301—111 |
| 1,587,930 | 6/26 | Wetzel | 280—282 X |
| 1,636,483 | 7/27 | Nielsen | 152—385 X |
| 2,675,045 | 4/54 | Henry | 152—7 |
| 3,021,049 | 2/62 | Settle. | |

FOREIGN PATENTS

| 240,075 | 7/62 | Australia. |
| 771,913 | 4/57 | Great Britain. |

ARTHUR L. LA POINT, *Primary Examiner.*